A. B. Mattoon.
Coulter Cleaner.
N° 91,464. Patented Jan. 15, 1869.
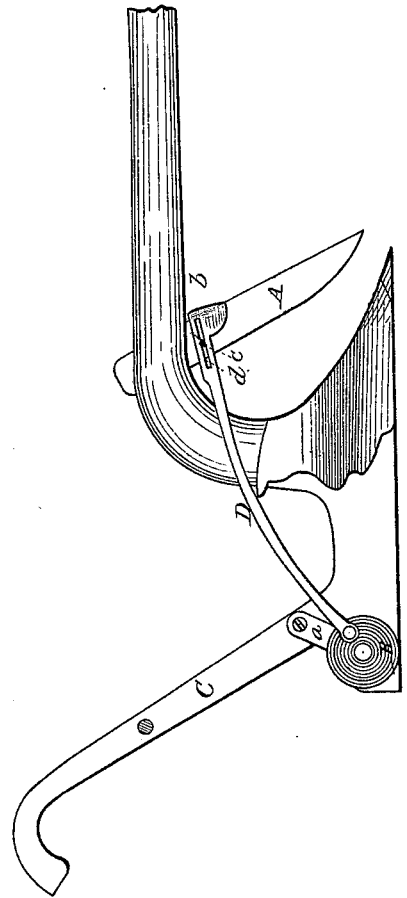
Witnesses.
Phil. F. Larner
Geo. W. Rothwell
Inventor.
A. B. Mattoon
By _____ Attys.

United States Patent Office.

A. B. MATTOON, OF AUBURN, NEW YORK.

Letters Patent No. 91,464, dated June 15, 1869.

IMPROVEMENT IN COULTER-CLEANERS.

The Schedule referred to in these Letters Patent and making part of the same.

*To all whom it may concern:*

Be it known that I, A. B. MATTOON, of Auburn, in the county of Cayuga, and State of New York, have invented a new and useful Improvement in Coulter-Clearers; and I do hereby declare the following to be a full, clear, and exact description of the same, sufficient to enable others skilled in the art to which my invention appertains, to make and use the same, reference being had to the accompanying drawing, forming part of this specification, in which is shown a side elevation of a plow, with my improvement applied, part of the share being broken away, to show the clearing-mechanism.

My invention is an improved device, automatically and regularly operated, for clearing the coulter of weeds, grass, and other accumulations, which, if allowed to remain, hinder the progress of the plow, and prevent its perfect working.

The object is to produce a clearer, which shall be simple, durable, not liable to get out of order, and applicable as well to plows in use as to those in course of construction.

The invention consists in forming the clearer with, or attaching it to the forward end of a rod, or arm, working on a pin fixed in the coulter, and pivoted at its rear end, eccentrically, to a wheel hung to the lower part of the frame of the plow, in such a manner as to be rotated by contact with the ground, and thus reciprocate the clearer.

Having thus stated the general nature of my invention, I will now proceed to describe it more fully in detail, referring to the accompanying drawings.

In the drawings—

A represents the coulter, attached to the beam, in the usual or any suitable manner.

B represents a wheel, fitted to turn on a stud fixed in a block, $a$, pivoted to the handle C of the plow. This wheel is so placed as to come into contact with the earth, and be thereby rotated, as the plow is drawn forward.

The block $a$ is pivoted, so as to allow the wheel to rise and fall, accommodating itself to any unevenness of the ground.

The curved clearer-arm D is pivoted at its rear end, eccentrically, to the wheel B, while its front end is enlarged at $b$, or has such enlargement attached to it.

This enlargement forms the clearer, its projecting edge being sharpened, to cut the weeds and remove the same, and all other matters gathered on the coulter.

The front end of the arm D is supported on a stud, $c$, fixed in the coulter, and passing through a slot, $d$, in said coulter-arm D.

The operation of this device will be obvious.

As the plow is drawn along, the wheel, by contact with the ground, is rotated, and the clearer thereby given a longitudinal, as well as a slight up-and-down motion, thereby cutting the weeds and other accumulations on the coulter, and effectually removing the same.

My device possesses the combined advantages of simplicity, durability, cheapness, ready application, and effective operation, as will be perceived at once by those engaged in the manufacture and use of plows, as heretofore made.

Having thus described my invention,

What I claim as new, and desire to secure by Letters Patent, is—

The combination of the clearing-arm D and wheel B, when constructed and arranged to operate substantially as herein described, for the purpose specified.

To the above, I have signed my name, this 31st day of March, 1869.

A. B. MATTOON.

Witnesses:
HORACE G. HERRICK,
C. D. GOODSELL.